United States Patent
Moll (10) Patent No.: US 7,151,973 B1
(45) Date of Patent: Dec. 19, 2006

(54) METHODS AND SYSTEMS FOR SCHEDULING AND BUFFER BALANCING

(75) Inventor: Georges-Henri Moll, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 917 days.

(21) Appl. No.: 10/198,028

(22) Filed: Jul. 18, 2002

(51) Int. Cl.
*G06F 19/00* (2006.01)
*G06F 9/50* (2006.01)
*G05B 19/418* (2006.01)

(52) U.S. Cl. .................. 700/100; 700/97; 700/101; 700/103; 700/106; 705/7; 705/8

(58) Field of Classification Search .............. 718/1, 718/100–108; 705/7, 8; 700/97, 100, 101, 700/103, 106
See application file for complete search history.

(56) References Cited

U.S. PATENT DOCUMENTS

| | | | | |
|---|---|---|---|---|
| 5,764,543 A | * | 6/1998 | Kennedy | 703/2 |
| 5,930,156 A | * | 7/1999 | Kennedy | 703/6 |
| 6,278,901 B1 | * | 8/2001 | Winner et al. | 700/99 |
| 6,347,256 B1 | * | 2/2002 | Smirnov et al. | 700/100 |
| 6,546,364 B1 | * | 4/2003 | Smirnov et al. | 703/22 |

OTHER PUBLICATIONS

Lu, Steve H. et al. "Distributed Scheduling Based on Due Dates and Buffer Priorities." IEEE. 1991.*

* cited by examiner

*Primary Examiner*—Lewis A. Bullock, Jr.
(74) *Attorney, Agent, or Firm*—Young Law Firm, P.C.

(57) ABSTRACT

A method of scheduling and making material time balancing decisions for a set of balanced tasks. The method includes steps of scheduling a first task from among the set of tasks, maintaining a reversible buffer over the interval, values of which over the time interval define a buffer profile. The buffer profile indicates the balance of items consumed by already scheduled tasks over the time interval. The next task to be scheduled is then selected from among all schedulable tasks of the set of tasks. A schedulable task is defined as a task that produces a quantity of items that is less than or equal to the balance of items consumed by the already scheduled tasks, as indicated by the buffer profile. The selected task may then be scheduled such that the end time of the selected task is latest.

21 Claims, 7 Drawing Sheets

FIG. 1 precedence constraint: e(t1) <= s(t2)

METHODS AND SYSTEMS FOR SCHEDULING AND BUFFER BALANCING

BACKGROUND OF THE INVENTION

1. Field of the Invention

The present invention relates generally to the field of operations research and more particularly to the field of production management.

2. Description of the Related Art

The field of Operations Research (OR) is concerned with the mathematical or scientific analyses of processes and provides tools that may be used in making decisions. For example, OR provides guidance on the optimal allocation and deployment of limited resources (such as people, machines, time, materials, storage, transportation and the like) through the use of modeling and mathematical algorithms. The field of production planning and scheduling may be thought of as a subset of the field of OR and is concerned with the optimal deployment of limited resources to efficiently produce an item or items in response to orders (a request for a specified number of a specified item by a specified date). Resources may have a certain availability defined by an availability profile and a certain capacity, which may be represented by any number that represents the power (of one or more machines over time, for example) to build something. A process specifies the manner in which resources are used to produce an item. The production of the items comprising the order may be subject to a number of constraints, such as limits on manpower, machine availability, inability to produce on Sundays or most any other limit on production. Those involved with such productions use both plans and schedules to manage the long and short-term production, respectively. A plan may be thought of as a long-term view of the production over predefined time quanta, whereas a schedule may be thought of as a shorter term set of activities necessary to achieve the desired production, albeit at a relatively lower level of granularity.

Constraint programming (hereafter, "CP"), is one OR technology among others aiming at solving of combinatorial optimization problems using computer programs. Classical use of CP for scheduling includes considering requirement constraints and precedence constraints. The present approach, in contrast, deals with a set of tasks to schedule, each of which has a domain of feasible start and end times (initially unknown), consumes a resource of a set of resources and produces an item or items. Requirement constraints express the resources required by the tasks.

In the conventional approach to planning and scheduling, there is the intermediate step of pegging, which consists of assigning flow from one task to another task. Pegging, therefore, consists of deciding material flows from task to task. In other words, pegging allows enforcing buffers to be balanced. A schedule is "buffer balanced" if the inventory never goes below zero. Pegging before balancing allows the generation of a "buffer balanced" schedule. For example, a pegging decision may be that item 3 produced by task 3 should be consumed by task 54. Conventionally, once pegging as been decided, the scheduling algorithm aims at satisfying the requirement constraints, and the precedence constraints, which entails decisions as to the start and end times of the involved tasks. Once the flow decisions have been taken, the flow of items from one task to another is immaterial to the conventional scheduling algorithms. Conventionally, therefore, once the pegging decisions have been taken, the scheduling algorithm may assign start and end times to tasks without considering which material flow from task; that is, what each task consumes or produces. All that matters is to satisfy the precedence constraints and the requirement constraints, meaning specifying the start and end times of the tasks, which completes the scheduling aspect of production management. However, it is to be noted that pegging before scheduling reduces the opportunities to optimize the resulting schedule.

Solving a scheduling problem generally using CP consists in searching for values of variable (constraints) that satisfy the equations (objectives). Those values that satisfy the equations are known as feasible values. In searching for feasible values, a tree search is often performed. In traversing the tree, a decision on a variable is made, followed by other decisions. At some point during the tree traversal, the scheduling of tasks may fail, at which point it may be necessary to backtrack (unschedule) one or more previously scheduled tasks. Tree searching is an important first concept in CP. Another important concept is that of domain reduction. The concept of domain reduction (hereafter, "DR") is that decisions (the setting of start or end times, for example) made at each node of the tree reduce the domain (set) of feasible values for some variable. Inversely, backtracking may increase the domain of feasible values for some variable. Typically, making a decision regarding the start and/or end time of a task affects the domain of feasible start and end times for one or more tasks that may require, for example, the resources generated by the scheduled task. Indeed, scheduling a task may reduce the domain of feasible values for one or more other tasks, which is known as domain propagation. In practice, once a scheduling decision is made during a tree traversal, a call is made to a propagation engine, which computes, based upon the latest decision, additional domain reductions based upon the scheduling equations. The propagation may depend upon start dates or ends dates, based upon precedence and/or requirement constraints.

Schedule or postpone is a subset of the classical approach to CP-based scheduling. Software products such as the ILOG® Scheduler (a C++ library that is based on the constraint programming library ILOG® Solver) help operational planners in accurately computing schedules that satisfy business objectives and constraints. For example, in backward scheduling, tasks are assigned start and end dates from the present backward in time. A given task t may have a start time s(t) and an end time e(t). The s(t) variable has a domain of values that may be expressed as the set of values ranging from the earliest start time of task t to the latest start time of task t. Similarly, the e(t) variable has a domain of values that may be expressed as the set of values ranging from the earliest end time of task t to the latest end time of task t. In backward scheduling, the scheduling module will try to schedule task t such that it has the maximal earliest end time. Conventionally, when we schedule backward, a task is schedulable only if all successor tasks thereof have been scheduled.

When the scheduling module fails to schedule a given task, a postpone tag may be associated with that task, effectively postponing the execution of the task until the tag is removed. This tag may be reset or removed when the domain of one of the variables thereof changes.

The schedule or postpone meta-heuristic is well suited to scheduling tasks subject to precedence constraints and resource capacity constraints. However, it does not apply when precedence constraints are replaced with item consumption and production. What are needed, therefore, are methods and systems enabling dynamic buffer balancing, concurrently with the generation of scheduling decisions.

Indeed, as pegging before scheduling reduces the optimization opportunities, what are needed are methods and systems enabling buffer balancing at the same time as scheduling.

SUMMARY OF THE INVENTION

In accordance with the above-described objects and those that will be mentioned and will become apparent below, a method of scheduling and making material time balancing decisions for a plurality of tasks within a time interval defined by an origin and an horizon, each of the tasks having a duration, consuming and producing items and utilizing a resource, includes steps of scheduling a first task from among the plurality of tasks; maintaining a reversible buffer over the interval, values of the reversible buffer over the time interval defining a buffer profile, the buffer profile indicating a balance of items consumed by already scheduled tasks over the time interval; selecting a next task to be scheduled from among all schedulable tasks of the plurality of tasks, a schedulable task being defined as a task that produces a quantity of items that is less than or equal to the balance of items consumed by the already scheduled tasks as indicated by the buffer profile, and scheduling the selected next task to be scheduled such that an end time of the selected task is latest.

The method may further include a step of backtracking through one or more previously scheduled tasks, in which at least one previously scheduled task is unscheduled and in which the profile of the reversible buffer is updated to account for the unscheduled task. The method may include respecting precedence constraints, in which case the definition of a schedulable task changes to a task for which all successor tasks have already been scheduled and that produces a quantity of items that is less than or equal to the balance of items consumed by the already scheduled tasks, as indicated by the buffer profile. The reversible buffer may be maintained by a software object and may be updated as needed. The plurality of tasks may be balanced in that such that for all items consumed and produced by the plurality of tasks, the total quantity of items produced is equal to the total quantity of items consumed. The definition of a schedulable task may include a condition that the task is not postponed. More than one buffer may be maintained for an item.

The present invention is also a computer system for scheduling and making material time balancing decisions for a plurality of tasks within a time interval defined by an origin and an horizon, each of the tasks having a duration, consuming and producing items and utilizing a resource, the method comprising the steps of, the computer system comprising: at least one processor; at least one data storage device; a plurality of processes spawned by said at least one processor, the processes including processing logic for scheduling a first task from among the plurality of tasks; maintaining a reversible buffer over the interval, values of the reversible buffer over the time interval defining a buffer profile, the buffer profile indicating a balance of items consumed by already scheduled tasks over the time interval; selecting a next task to be scheduled from among all schedulable tasks of the plurality of tasks, a schedulable task being defined as a task that produces a quantity of items that is less than or equal to the balance of items consumed by the already scheduled tasks as indicated by the buffer profile, and scheduling the selected next task to be scheduled such that an end time of the selected task is latest.

The present invention may also be viewed as a machine readable medium having stored thereon data representing sequences of instructions which, when executed by a computer system, causes said computer system to perform the steps of scheduling a first task from among the plurality of tasks; maintaining a reversible buffer over the interval, values of the reversible buffer over the time interval defining a buffer profile, the buffer profile indicating a balance of items consumed by already scheduled tasks over the time interval; selecting a next task to be scheduled from among all schedulable tasks of the plurality of tasks, a schedulable task being defined as a task that produces a quantity of items that is less than or equal to the balance of items consumed by the already scheduled tasks as indicated by the buffer profile, and scheduling the selected next task to be scheduled such that an end time of the selected task is latest.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE INVENTION

1. Functional Description

The present invention reinterprets the concepts of buffer balancing and scheduling by redefining the concept of what is a schedulable task. Unlike the classical approach, the present invention is concerned not with precedence constraints but with material consumption/production constraints; that is, what materials or items does a particular task consume (and in what quantity) and what items does the task produce (and in what quantity). During the scheduling process, precedence constraints need not used, as the precedence decisions have not yet been made. Indeed, material flow (buffer balancing) decisions are made, according to the present invention, during the scheduling process.

According to an embodiment of the present invention, a schedulable task is a task for which all items produced by the task are ready to be consumed by a previously scheduled task, as detailed graphically and mathematically. Indeed, for backward scheduling, the task or tasks that consume the item or items is scheduled first, followed by the task or tasks that produce the item or items. For forward scheduling, the direction of time is changed from t to −t. The present invention takes into account over and under production and there is no need, therefore, to assume that the set of tasks are balanced (i.e., for all items consumed and produced in the task set, the total quantity produced is equal to the total quantity consumed). Moreover, according to the present invention, the next task to be scheduled may be that task selected from amongst all schedulable tasks that has the maximal (latest) end time.

Figure 1:
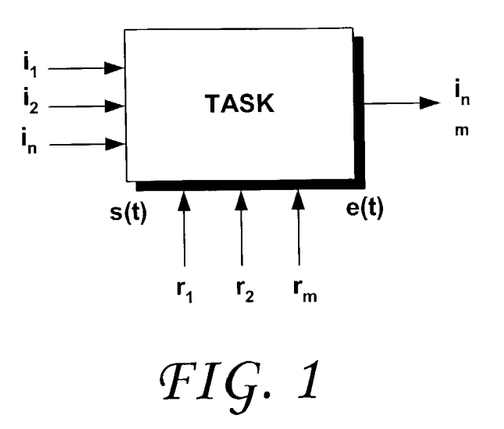
FIG. 1 is a diagram of a task that consumes items, requires resources and that produces items.

The principles of the present invention set out above are detailed below and in the figures. FIG. 1 is a diagram of a task that consumes items, requires resources and that produces items. As shown, the task is defined by a start time s(t) and an end time e(t). Scheduling a task includes assigning values to the variables s(t) and e(t). The exemplary task of FIG. 1 consumes items $i_1, i_2 \ldots i_n$, utilizes resources $r_1, r_2 \ldots r_m$ and produces one or more items $i_{n,m}$.

Figure 2:
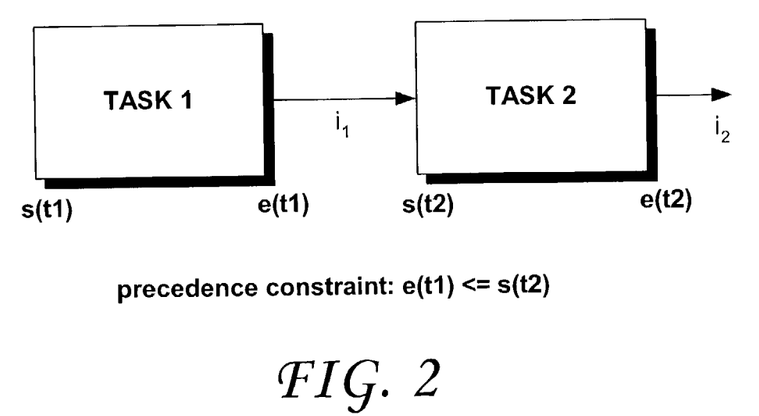
FIG. 2 illustrates the conventional precedence constraint.

FIG. 2 illustrates a conventional precedence constraint in which a task is schedulable when all successor tasks are scheduled. As shown, in conventional backward scheduling, the precedence constraint dictates that, for example, task 1 cannot be scheduled (i.e., its s(t1) and e(t2) variables quantified) until its successor task (task 2) has been scheduled (i.e., its s(t2) and e(t2) variables quantified).

The following mathematically expresses the present method of scheduling and buffer balancing. That is, the following details the manner in which a next activity to schedule is selected, taking into account the buffer profiles of the activities scheduled so far (taking into account excesses and shortages in production) in the scheduling algorithm.

A is the set of activities "a" to schedule.

For each item "i", $QP_{ia}$ is the quantity of item i that activity a produces and $QC_{ia}$ is the quantity of item i that activity a consumes. A variable $XS_i$ is defined such that:

$$XS_i = \sum_{a \in A} QP_{ia} - \sum_{a \in A} QC_{ia}$$

If $XS_i > 0$, $XS_i$ represents an excess in the production of item I whereas if $XS_i < 0$, $XS_i$ represents a shortage in the production of item i. If $XS_i = 0$, the input is perfectly material balanced for item i.

s(a) is defined as the start variable for activity a and e(a) is the end variable for activity a. Therefore, if activity a is scheduled with a start time of s(a)=t1 and an end time of e(a)=t2, scheduled activity a may be represented by a[t1, t2].

At any point during the scheduling process,

A=SA∪UA

SA∩UA=∅ where SA is the set of scheduled activities A and UA is the set of unscheduled activities A. At the beginning of the scheduling, UA=A and SA=0. Conversely, at the end of the scheduling, UA=0 and SA=A.

At some point in time during the scheduling algorithm, we can define Pr of $_{(i)}$, the profile for item i, using the activities scheduled so far in SA:

$$Pr \text{ of}_{i,SA}(t) = \sum_{\substack{a \in SA \\ s/t \\ e(a) \leq t}} QP_{ai} - \sum_{\substack{a \in SA \\ s/t \\ s(a) \leq t}} QC_{ai}$$

We schedule the activities in time interval [0,H]; that is, from the origin at 0 to the horizon at H.

Let D be a set of demands, d a demand in D. The time for d is denoted by t(d) and the quantity for d is denoted by q(d). Let S be a set of supplies, s a supply in this set S. The time for s is denoted by t(s) and the quantity for s is denoted by q(s). The profile associated with the sets of demands and supplies (D,S) is defined by:

$$Pr \text{ of}_{S,D}(t) = \sum_{\{s \in S/t(s) \leq t\}} q(s) - \sum_{\{d \in D/t(d) \leq t\}} q(d)$$

Let "a" be an activity:

d(a, i) represents the demand associated with a for item i: $q(d(a, i))=QC_{ai}$, $t(d(a,i))=s(a)$.

Likewise s(a,i) represents the supply associated with a for item i: $q(s(a,i))=QP_{ai}$, $t(s(a,i))=e(a)$ Let A be a set of activities.

$$D(A, i) = \underset{a \in A}{Y} \{d(a, i)\}$$

$$S(A, i) = \underset{a \in A}{Y} \{s(a, i)\}$$

From those definitions, it is clear that:

Pr of $_{i,SA}$=Pr of $_{S(SA,i),D(SA,i)}$

Selector Definition

The selector to choose what next activity to schedule consists in a condition and a criterion.

Condition

The condition for an activity to be schedulable, according to the present invention is that all items that the activity produces can be consumed at some point in time by already scheduled activities, taking the shortage or excess of such items into account.

Given, SA (set of already scheduled activities), what Will Be Consumed after time t (for item i) can be represented by function $WBC_i(t)$:

$$WBC_{D,S}(t) = \sum_{\{d \in D/t(d) \leq t\}} q(d) - \sum_{\{s \in S/t(s) \leq t\}} q(s)$$

$$WBC_i(t) = WBC_{D(SA,i),S(SA,i)}(t) - XS_i$$

It is straightforward to see that:

$WBC_i(t)=Pr$ of $_{i,SA}(t)-Pr$ of $_{i,SA}(H)-XS_i$

The property we wish to maintain incrementally (each time we schedule a new activity) is:

$\forall i, WBC_i \geq 0$

So if we choose "a", we want it such that:

$\forall i, WBC_{D(SA,i),S(SA,i) \cup \{s(a,i)\}}(t)-XS_i \geq 0$     (condition 1)

We can call this quantity $(WBC_i+s(a,i))(t)$

It is clear that:

$$\begin{cases} \forall t \geq t(s), (WBC+s)(t) = WBC(t) \\ \forall t < t(s), (WBC+s)(t) = WBC(t) - q(s) \end{cases}$$

So condition 1 becomes a condition on $e(a)=t(s(a,i))$:

$\forall i, \forall t < e(a); WBC_i(t) - QP_{ai} \geq 0$

This condition is achieved by choosing "a" such that: $t(a)>0$, where $t(a)$ is defined by $t(a,i) = \max\{t / Pr \text{ of }_{i,SA}(t) - Pr \text{ of }_{i,SA}(H) - XS_i \geq QP_{ai}\}$ $t(a, i) = \max\{t / Pr \text{ of}_{i,SA}(t) - Pr \text{ of}_{i,SA}(H) - XS_i \geq QP_{ai}\}$ $t(a) = \min_t t(a, i)$ Criterion:

Among those "a" such that $t(a)>0$, we want to choose the one for which $t'(a)$ is maximal, where $t'(a)$ is defined by $t'(a)=\min(t(a), emax(e(a))))$ $a = \arg \min(t'(a))$ Scheduling the Activity:

Once "a" is chosen, we can then enforce constraint $e(a) \geq t'(a)$, let propagate a new value for $emax(e(a))$, and then try $e(a)=emax(e(a))$.

Figure 3:
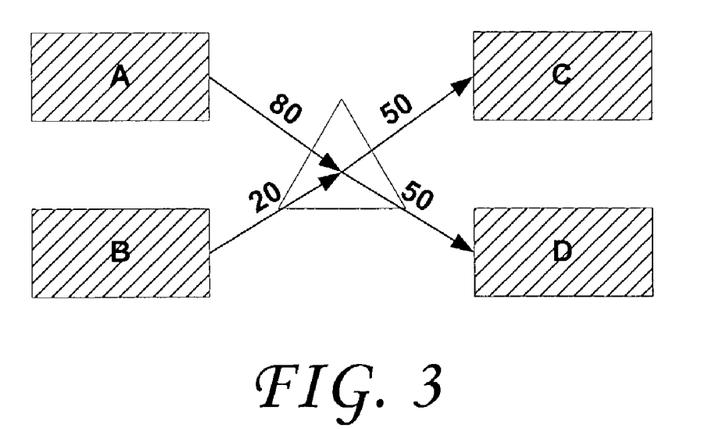
FIG. 3 is a diagram illustrating tasks and a buffer, according to the present invention.

FIG. 3 is a diagram illustrating tasks and a buffer, according to the present invention. As shown, tasks A and B produce respective quantities of an item. These quantities are stored in a buffer, represented by the triangle. The value of the buffer, therefore, represents the quantity of an item available for consumption by a previously scheduled task. Note that the buffer may show either a positive quantity of items available, which signifies an availability of the item in question or a negative quantity of items available, which signifies a demand for the item in question. As shown in FIG. 3, Task A produces 80 (of some item), while Task B produces 20 (of the same item). For illustrative purposes, both tasks A and B have a duration of 4 (of some unit of time such as seconds, hours, days for example). For simplicity of illustration, the lot of items (80 for Task A, 20 for Task B) is available at the end time of the respective tasks and both tasks A and B share the use of some unitary resource R2. Similarly, Tasks C and D each consume 50 of the items produced by task A and B and such consumption is assumed to take place at the respective start times of tasks C and D. Tasks C and D are also assumed to have a duration of 4 and share the use of some unitary resource R1. Moreover, in the present example, C and D are constrained by a precedence constraint, in that D is more urgent than C, so that D must precede C. Moreover, both tasks C and D must finish before time 20. A Just In Time (hereafter, "JIT") schedule must be developed while making judicious material flow (balancing) decisions.

Figure 4:
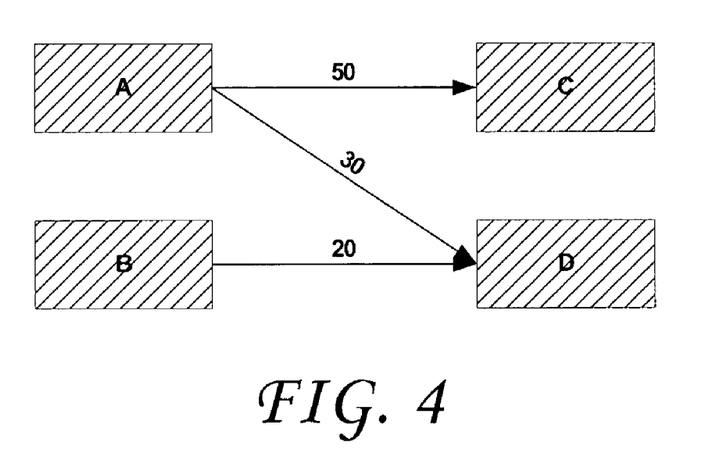
FIG. 4 is a diagram illustrating a first possible pegging of the tasks shown in FIG. 3.
Figure 5:
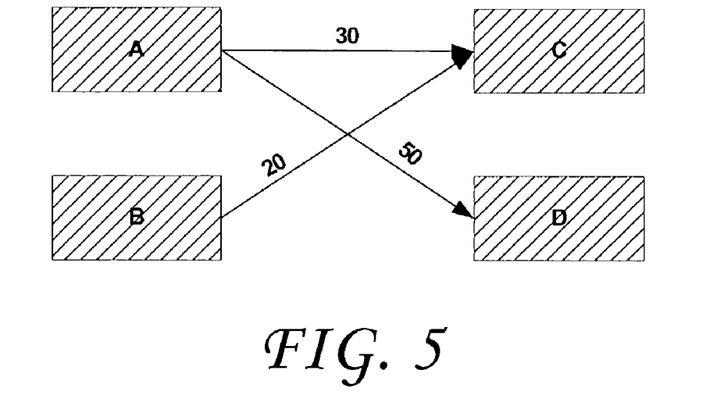
FIG. 5 is a diagram illustrating a second possible pegging of the tasks shown in FIG. 3.
Figure 6:
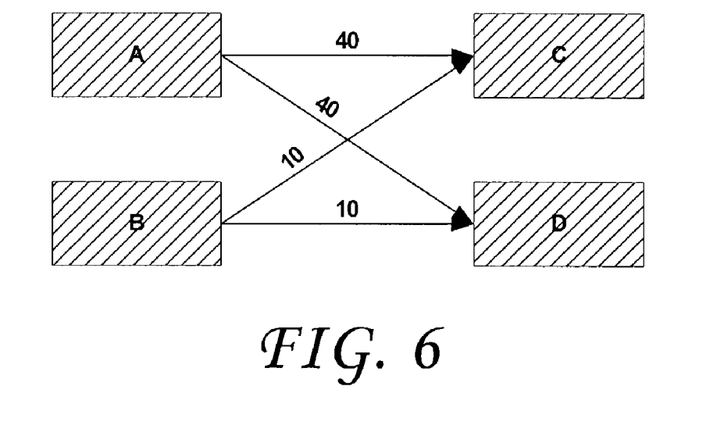
FIG. 6 is a diagram illustrating another possible pegging of the tasks shown in FIG. 3.

FIG. 4 is a diagram illustrating a first possible pegging of the tasks shown in FIG. 3. As shown therein, Task C may consume 50 of the 80 items produced by Task A, whereas Task D may consume the remaining 30 of the 80 items produced by Task A, the balance of the 20 items consumed by Task D being provided by Task B. This balancing, however, forces both Task A and Task B to precede Task D, which itself must precede Task C, according to the above-cited precedence constraint imposed upon Task C and D. This is because Task D has to wait for the completion of Tasks A and B for the production of the 50 items that it requires at its start time. This is not an optimal balancing. FIG. 5 is a diagram illustrating a second possible pegging of the tasks shown in FIG. 3. As shown, Task C consumes 30 of the 80 items produced by Task A and all 20 of the items produced by Task B. Task D, on the other hand, consumes its full requirement of 50 items from Task A. The pegging shown in FIG. 5 is preferable to the pegging shown in FIG. 4, as it enables Task B and D to overlap one another, as Task D does not consume any of the items produced by Task C. FIG. 6 shows yet another possible pegging for the tasks shown in FIG. 3. As shown, each of the tasks A and B contribute half of their production to each successor task C and D. Many other combinations are possible. The present invention enables optimal scheduling and pegging decisions to be made, thereby more efficiently allocating tasks, material resources and time.

Figure 7:
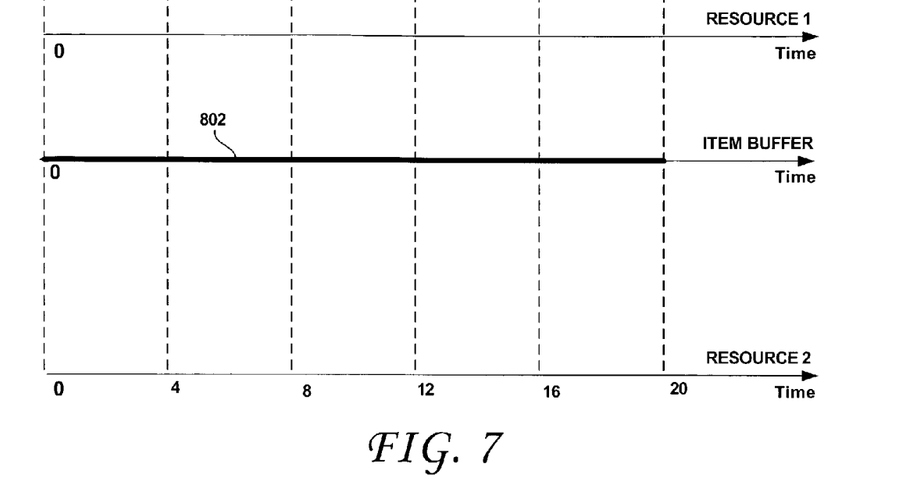
FIG. 7 shows an initial state of a buffer, together with scheduled tasks utilizing resources 1 and 2, to illustrate aspects of the present invention.

FIG. 7 shows the initial state of the buffer balancing method of the present invention. As shown therein, the topmost timeline represents the usage of resource R1, the middle timeline represents the state of buffer over time, whereas the bottom most timeline shows the utilization of the resource R2 over time. At the initial state shown in FIG. 7, all tasks may be placed anywhere within the R1 and R2 timelines; that is, within the time horizon envisaged. In the case of FIGS. 7–11, the origin is 0 and the time horizon is an illustrative and exemplary 20 (of any units of time). Therefore, Tasks A, B, C and D have full flexibility to be placed anywhere within the [0; 20] time interval. Given a fixed duration of 4 for each of the candidate tasks to be scheduled as detailed above relative to FIGS. 3–6, the domain for all start variables is [0; 16] and the domain for all end variables is [4; 20]. In the example developed herein, only Tasks C and D are schedulable, as their production is immaterial to the present example, as no successors are specified for these tasks. For JIT scheduling, backward scheduling is the most efficient scheduling method. Before any of the Tasks A, B, C and D are scheduled and before resources are either consumed or produced, the profile of the item buffer is flat (zero), as shown by the thick black line referenced at 802. If i represents an item and Bi the buffer associated with item i, then Bi(t) represents the value of the buffer 802 at time t.

Figure 8:
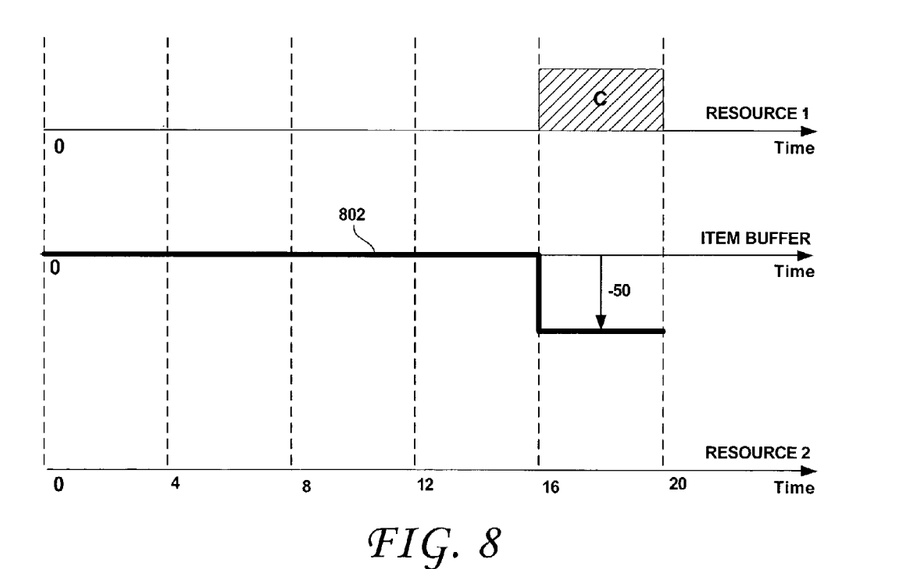
FIG. 8 illustrates a first exemplary step of the method of balancing and scheduling according to an embodiment of the present invention.

FIG. 8 illustrates a first exemplary step of the method of balancing and scheduling according to the present invention. As the scheduling is backward for JIT scheduling, the first of the four tasks to be scheduled is Task C, because Task D must precede Task C. Choosing the maximal end time within the [0; 20] time interval available, Task C is scheduled to occupy resource R1 during the time interval [16; 20]. Therefore, s(C)=16 and e(C)=20, as shown by the hashed box labeled C in FIG. 8. Since Task C is assumed to consume 50 items as of its start time s(C), the item buffer profile is non-zero during the interval in which Task D uses resource R1. As Task C consumes 50 items as of time 16, Bi[16; 20], the value of the buffer profile during the interval [16;20] is −50 and remains zero in the interval [0; 16]. As Task C is now scheduled, this choice affects the available horizon in which D may be scheduled. Indeed, the start horizon for Task D is now reduced to [0; 12] and the end time horizon for Task D is reduced to [4; 16], since Task D has duration 4 and since Task D also utilizes Resource 1. Moreover, Task B is now schedulable before 16, since B produces 20, which is less than the 50 items needed by Task C. In other words, because there is a currently scheduled task (Task C) that is ready to consume all 20 items produced by Task B, Task B, according to the present invention, is schedulable. Task A however, is not yet schedulable, as there are no currently scheduled tasks that are ready to consume all 80 items produced by Task A. Tasks B and D are then both candidates for the next task to be scheduled.

Figure 9:
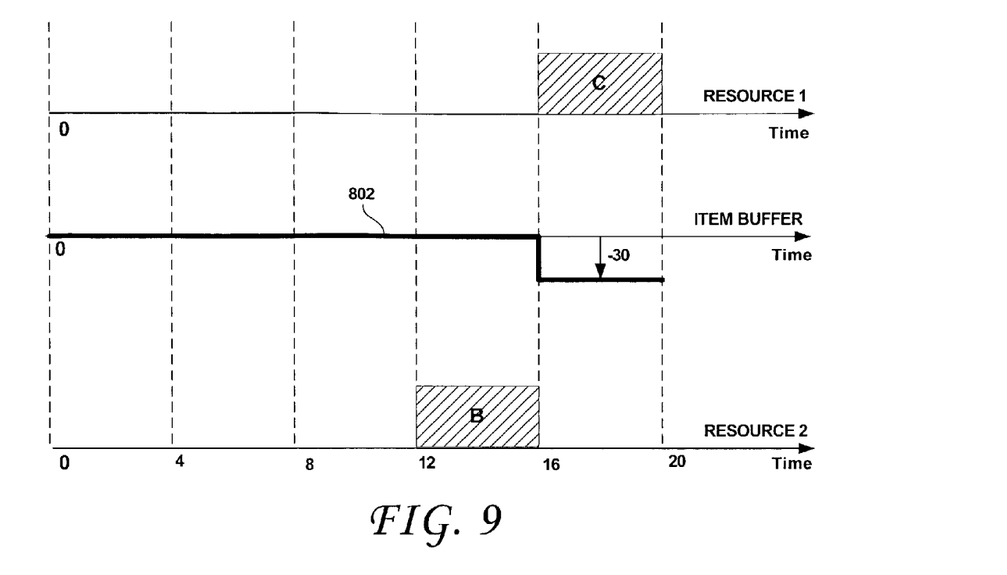
FIG. 9 illustrates a second exemplary step of the method of balancing and scheduling according to an embodiment of the present invention.

FIG. 9 illustrates a second exemplary step of the method of balancing and scheduling according to the present invention. Two of the central aspects of the present invention are that a task is schedulable (for backward scheduling purposes) when all that it produces is ready to be consumed by an already scheduled task or tasks and that the next task to be scheduled is that task in which the consumption time for the items that it produces is maximal (latest in time). Applying the foregoing, Task B is chosen to be scheduled to occupy resource R2 from s(B)=12 to e(B)=16, as Task B is properly schedulable and is scheduled in such a manner that the consumption time for the items it produces is the latest possible. In the present example, the latest time for producing the 20 items is immediately before the start time of Task C, which is the task that will consume the 20 produced items. With the scheduling and balancing of Task B and the items it produces, the profile of the item buffer changes. As shown, Bi[16; 20] increases to −30, as the production of 20 items at time 16 reduced the inventory of such items from −50 to −30. Of the remaining tasks that have yet to be scheduled, only Task D is properly schedulable. Task A, on the other hand, is not schedulable according to the present invention, as all 80 items that it produces are not ready to be consumed by already scheduled Tasks B or C. Indeed, already scheduled Task C only requires 30 additional items, whereas the items consumed by already scheduled Task B are ignored for purposes of the present example, as are the items consumed by Task A and the items produced by Tasks C and D.

Figure 10:
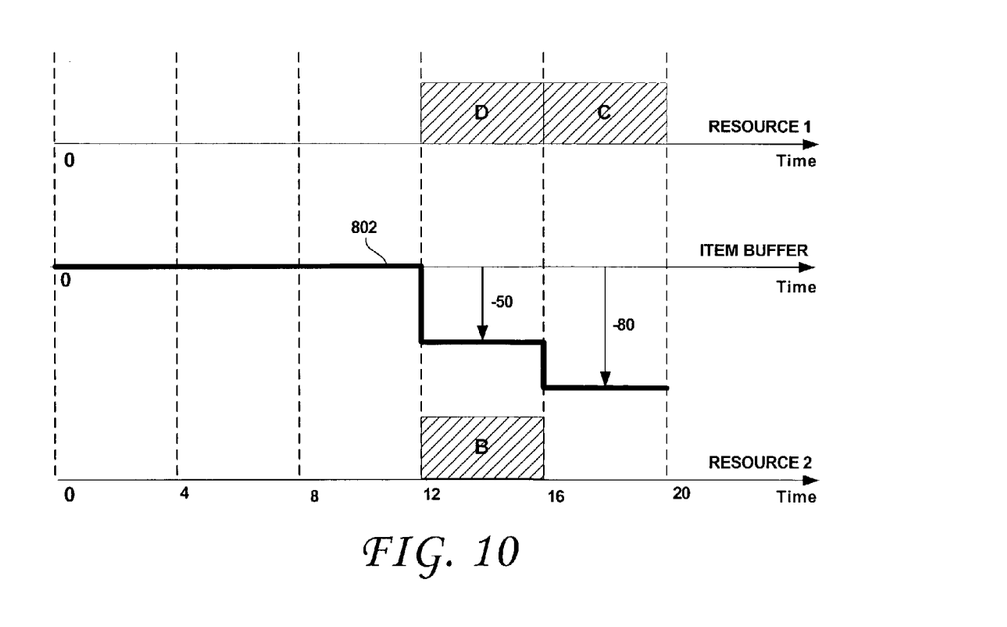
FIG. 10 illustrates a third exemplary step of the method of balancing and scheduling according to an embodiment of the present invention.

FIG. 10 illustrates a third exemplary step of the method of balancing and scheduling according to the present invention, in which Task D is chosen to be scheduled next. Choosing the maximal consumption time for the items to be produced for Task D yields a scheduling decision in which s(D)=12 and e(D)=16 for resource R1, as shown in FIG. 10. Bi[12; 16] changes to −50 and Bi[16; 20] to −80. This is because at time 12, Task D consumes 50 items and at time 16, Task C consumes another 50 items. This would yield a deficit of 100, but for the production of 20 items at time 16 by Task B, which production reduces the deficit to −80 during the interval [16; 20], as shown by the item buffer profile 802 of FIG. 10. The scheduling of Task D affects the available horizon for Task A. From the point of view of the item buffer, Task A is schedulable at time 16, as there is now a demand at that point in time for all 80 items that Task A produces. This propagates through resource R2 (occupied between time 12 to time 16) to cause the available start and end horizon for Task A to be [0; 12]. Choosing the maximal end time, according to the present invention, leads to a selection for the end time e(A) of time 12.

Figure 11:
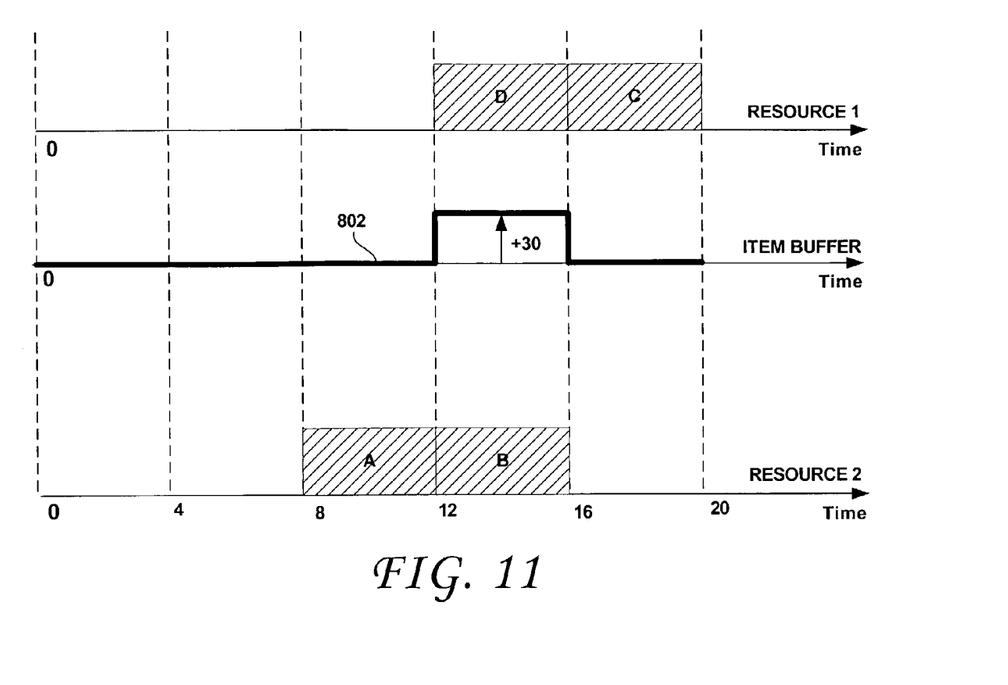
FIG. 11 illustrates a fourth exemplary step of the method of balancing and scheduling according to an embodiment of the present invention.

FIG. 11 illustrates the final state of the scheduling of Tasks A, B, C and D, in which the start time of Task A has been propagated (through previous scheduling choices) to s(A) =8, as the duration of Task A is 4. As shown in FIG. 11, Bi, the value of buffer profile 802 is now zero during the interval [0; 12], +30 during [12; 16] and thereafter zero to the horizon at 20. This is because the scheduling of Task A injected 80 items at time 12, of which 50 items were consumed by Task D at time 12, leading to a surplus of items of 30 items during the interval [12;16]. At time 16, Task B injected another 50 items into the buffer which, when combined with the existing surplus of 30 items, made a sufficient number of items (80 items) available for Task C's consumption at time 16. Note the efficient flow of materials from task to task, the relatively low buffer levels throughout the [0; 20] interval, the overlapping of Tasks D and B and the (theoretically instantaneous) short interval between production and consumption of items in the developed schedule. The present invention, therefore, enables an advantageously efficient JIT process to be developed.

In scheduling a task according to the present invention, the criterion for determining whether a task is schedulable is not whether all successor tasks have been scheduled, but is defined in terms of production and consumption of the tasks. Material flow decisions, according to the present invention, are made while scheduling. Using buffer profiles as detailed above, a task T may be said to be schedulable if the set of already scheduled tasks has led to a buffer profile that shows sufficient demand for what T produces. A negative buffer value, in this manner, signifies that there exists one or more tasks that are ready to consume a quantity of items less than or equal to the negative buffer value. Stated differently, a negative buffer value corresponds to a hole in the inventory of the item in question. The reason that negative buffer values occur in the present invention is that the consumer(s) of the item are scheduled before the producer(s) thereof. Any candidate task(s) that produces all or a fraction of the quantity of items required by a currently scheduled task may be scheduled to fill all or part of the demand for that item. The present invention assumes that the set of tasks are balanced, meaning that for all items consumed and produced in the task set, the total quantity of items produced is equal to the total quantity of such items that is consumed. However, if the tasks are not balanced, present invention also works: the difference between total quantity produced and total quantity consumed is modeled in previous equations by variable XS, which can be positive or negative. Freeing the scheduling module from rigid precedence constraints enlarges the universe of available candidate tasks to include any task that produces an item in demand by an already scheduled task. The feasibility space, using the present invention, is believed to be larger than when scheduling using only precedence constraints. Optimality is also believed to be easier to reach, in that fewer backtracking steps are likely to be necessary. However, the present invention may readily be used in conjunction with precedence constraints, as was demonstrated herein relative to the example developed relative to FIGS. 7–11.

The buffer 802, according to the present invention, may be reversible, in that the buffer profile may be suitably updated when backtracking becomes necessary to unscheduled one or more previously scheduled tasks. In other words, an object is reversible if its state is restorable upon backtracking. The buffer profile, therefore, is non monotonic and may be configured to change appropriately when the set of scheduled tasks changes (i.e., as tasks are scheduled and/or unscheduled). Such buffers 802 may be maintained by demons, as known in the CP arts. Such a reversible buffer has a time extension equal to that of the schedule; that is, an interval [origin; horizon]. In backward scheduling, the value of a reversible buffer according to the present invention at the horizon corresponds to the balance of tasks scheduled so far.

2. Hardware Description

Figure 12:
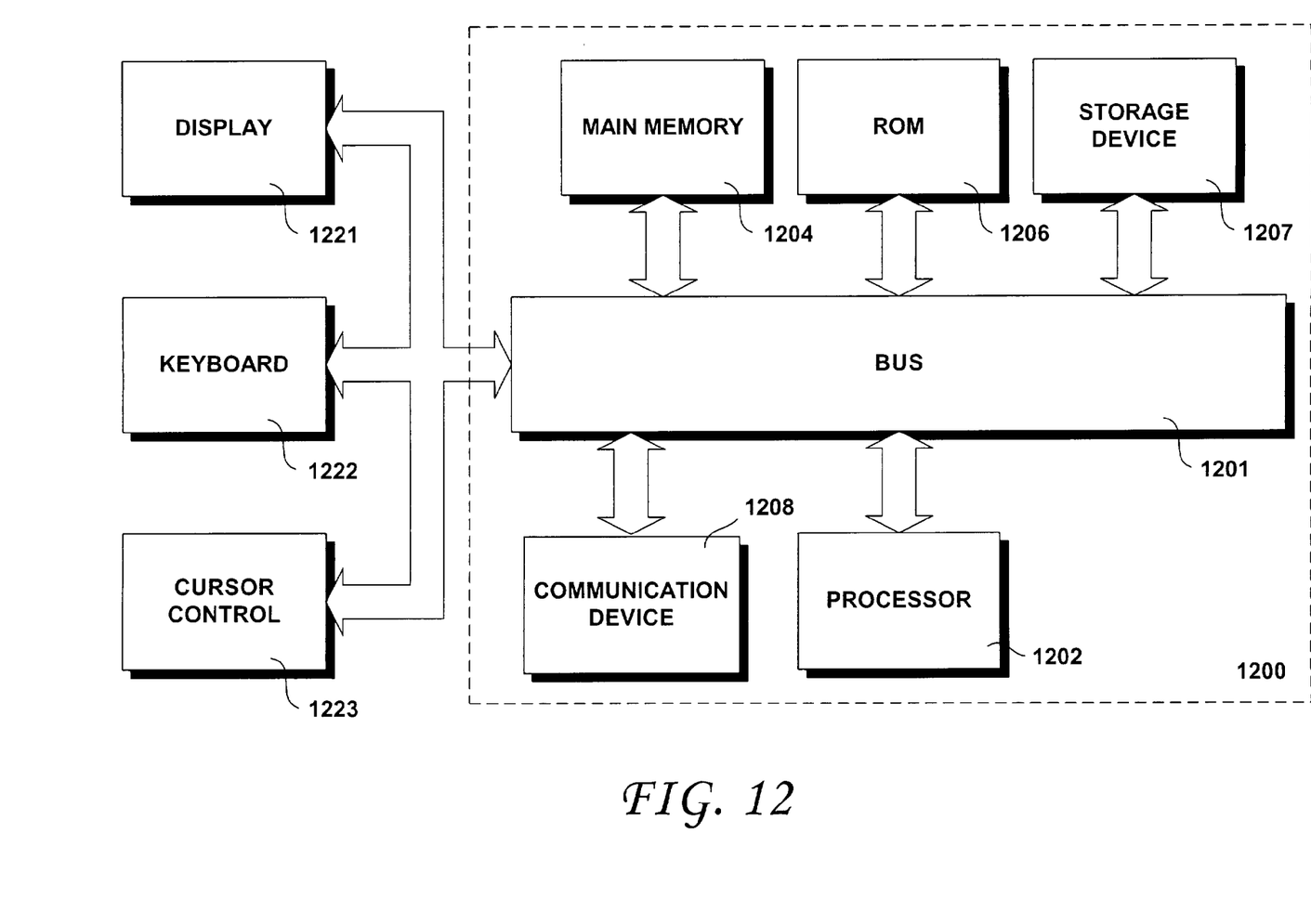
FIG. 12 is a diagram of a computing device with which the present invention may be practiced.

FIG. 12 illustrates a block diagram of a computing device 1200 with which an embodiment of the present invention may be implemented. Computing device 1200 includes a bus 1201 or other communication mechanism for communicating information, and a processor 1202 coupled with bus 1201 for processing information. Computing device 1200 further comprises a random access memory (RAM) or other dynamic storage device 1204 (referred to as main memory), coupled to bus 1201 for storing information and instructions to be executed by processor 1202. Main memory 1204 also may be used for storing temporary variables or other intermediate information during execution of instructions by processor 1202. Computing device 1200 may also include a read only memory (ROM) and/or other static storage device 1206 coupled to bus 1201 for storing static information and instructions for processor 1202. A data storage device 1207, such as a magnetic disk or optical disk, may be coupled to bus 1201 for storing information and instructions. A communication device 1208, such as a modem or network (such as Ethernet, for example) card may also coupled to the bus 1201 to provide access to a network, such as the Internet, for example.

The computing device 1200 may also be coupled via bus 1201 to a display device 1221, such as a cathode ray tube (CRT), for displaying information to a computer user. An alphanumeric input device 1222, including alphanumeric and other keys, is typically coupled to bus 1201 for communicating information and command selections to processor 1202. Another type of user input device may be the user's own voice or cursor control 1223, such as a mouse, a trackball, or cursor direction keys for communicating direction information and command selections to processor 1202 and for controlling cursor movement on display 1221.

The present invention is related to the use of computing device 1200 for scheduling and balancing, as described herein. According to one embodiment, the processing may be carried out by one or more computing devices 1200 in response to processor(s) 1202 executing sequences of instructions contained in memory 1204. Such instructions may be read into memory 1204 from another computer-readable medium, such as data storage device 1207 and/or from a remotely located server. Execution of the sequences of instructions contained in memory 1204 causes processor(s) 1202 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method of scheduling and making material time balancing decisions for a plurality of tasks within a time interval defined by an origin and an horizon, each of the tasks having a duration, consuming and producing items and utilizing resources, the method comprising the steps of:
    scheduling a first task from among the plurality of tasks;
    maintaining a reversible buffer over the interval, values of the reversible buffer over the time interval defining a buffer profile, the buffer profile indicating a balance of items consumed by already scheduled tasks over the time interval;
    subsequently selecting a next task to be scheduled from among all remaining schedulable tasks of the plurality of tasks, a schedulable task being defined as a task that produces a quantity of items that is less than or equal to the balance of items consumed by the already scheduled tasks as indicated by the buffer profile, and
    scheduling the selected next task to be scheduled such that an end time of the selected task is latest.

2. The method of claim 1, further comprising the step of backtracking through one or more previously scheduled tasks, wherein at least one previously scheduled task is unscheduled and wherein the profile of the reversible buffer is updated to account for the unscheduled task.

3. The method of claim 1, wherein when the method includes respecting precedence constraints, the definition of a schedulable task changes to a task for which all successor tasks have already been scheduled and that produces a quantity of items that is less than or equal to the balance of items consumed by the already scheduled tasks, as indicated by the buffer profile.

4. The method of claim 1, wherein the reversible buffer is maintained by a software object or is updated as needed.

5. The method of claim 1, wherein the plurality of tasks are balanced in that such that for all items consumed and produced by the plurality of tasks.

6. The method of claim 1, wherein the definition of a schedulable task includes a condition that the task is not postponed.

7. The method of claim 1, further comprising a step of maintaining more than one buffer for an item.

8. A computer system for scheduling and making material time balancing decisions for a plurality of tasks within a time interval defined by an origin and an horizon, each of the tasks having a duration, consuming and producing items and utilizing resources, the method comprising the steps of, the computer system comprising:
    at least one processor;
    at least one data storage device;
    a plurality of processes spawned by said at least one processor, the processes including processing logic for:
    scheduling a first task from among the plurality of tasks;
    maintaining a reversible buffer over the interval, values of the reversible buffer over the time interval defining a buffer profile, the buffer profile indicating a balance of items consumed by already scheduled tasks over the time interval;
    subsequently selecting a next task to be scheduled from among all remaining schedulable tasks of the plurality of tasks, a schedulable task being defined as a task that produces a quantity of items that is less than or equal to the balance of items consumed by the already scheduled tasks as indicated by the buffer profile, and
    scheduling the selected next task to be scheduled such that an end time of the selected task is latest.

9. The computer system of claim 8, further comprising processing logic for backtracking through one or more previously scheduled tasks, wherein at least one previously scheduled task is unscheduled and wherein the profile of the reversible buffer is updated to account for the unscheduled task.

10. The computer system of claim 8, further including logic for processing precedence constraints, wherein the definition of a schedulable task changes to a task for which all successor tasks have already been scheduled and that produces a quantity of items that is less than or equal to the balance of items consumed by the already scheduled tasks, as indicated by the buffer profile.

11. The computer system of claim 8, wherein the reversible buffer is maintained by a software object or is updated as needed.

12. The computer system of claim 8, wherein the plurality of tasks are balanced in that such that for all items consumed and produced by the plurality of tasks, the total quantity of items produced is equal to the total quantity of items consumed.

13. The computer system of claim 8, wherein the definition of a schedulable task includes a condition that the task is not postponed.

14. The computer system of claim 8, further comprising processing logic for maintaining more than one buffer for an item.

15. A machine readable medium having stored thereon data representing sequences of instructions which, when executed by a computer system, causes said computer system to perform the steps of:

scheduling a first task from among the plurality of tasks;

maintaining a reversible buffer over the interval, values of the reversible buffer over the time interval defining a buffer profile, the buffer profile indicating a balance of items consumed by already scheduled tasks over the time interval;

subsequently selecting a next task to be scheduled from among all remaining schedulable tasks of the plurality of tasks, a schedulable task being defined as a task that produces a quantity of items that is less than or equal to the balance of items consumed by the already scheduled tasks as indicated by the buffer profile, and scheduling the selected next task to be scheduled such that an end time of the selected task is latest.

16. The medium of claim 15, further comprising the step of backtracking through one or more previously scheduled tasks, wherein at least one previously scheduled task is unscheduled and wherein the profile of the reversible buffer is updated to account for the unscheduled task.

17. The medium of claim 15, wherein when the steps include respecting processing precedence constraints, the definition of a schedulable task changes to a task for which all successor tasks have already been scheduled and that produces a quantity of items that is less than or equal to the balance of items consumed by the already scheduled tasks, as indicated by the buffer profile.

18. The medium of claim 15, wherein the reversible buffer is maintained by a software object or is updated as needed.

19. The medium of claim 15, wherein the plurality of tasks are balanced in that such that for all items consumed and produced by the plurality of tasks, the total quantity of items produced is equal to the total quantity of items consumed.

20. The medium of claim 15, wherein the definition of a schedulable task includes a condition that the task is not postponed.

21. The medium of claim 15, further comprising a step of maintaining more than one buffer for an item.

\* \* \* \* \*